(12) United States Patent
Bernstein

(10) Patent No.: US 8,743,091 B2
(45) Date of Patent: Jun. 3, 2014

(54) ACOUSTIC MULTI-TOUCH SENSOR PANEL

(75) Inventor: Jeffrey Traer Bernstein, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1212 days.

(21) Appl. No.: 12/184,232

(22) Filed: Jul. 31, 2008

(65) Prior Publication Data

US 2010/0026667 A1  Feb. 4, 2010

(51) Int. Cl.
*G06F 3/043* (2006.01)

(52) U.S. Cl.
USPC .......................................................... 345/177

(58) Field of Classification Search
USPC .......................... 345/156, 173, 177
See application file for complete search history.

(56) References Cited

U.S. PATENT DOCUMENTS

| 3,673,327 | A | * | 6/1972 | Johnson et al. | 178/18.04 |
|---|---|---|---|---|---|
| 4,506,354 | A | * | 3/1985 | Hansen | 367/101 |
| 4,746,914 | A | * | 5/1988 | Adler | 345/177 |
| 4,825,212 | A | * | 4/1989 | Adler et al. | 345/177 |
| 5,483,261 | A | | 1/1996 | Yasutake | |
| 5,488,204 | A | | 1/1996 | Mead et al. | |
| 5,591,945 | A | | 1/1997 | Kent | |
| 5,766,493 | A | | 6/1998 | Shin | |
| 5,825,352 | A | | 10/1998 | Bisset et al. | |
| 5,835,079 | A | | 11/1998 | Shieh | |
| 5,854,450 | A | * | 12/1998 | Kent | 178/18.04 |
| 5,880,411 | A | | 3/1999 | Gillespie et al. | |
| 6,078,315 | A | | 6/2000 | Huang | |
| 6,091,406 | A | * | 7/2000 | Kambara et al. | 345/177 |
| 6,188,391 | B1 | | 2/2001 | Seely et al. | |
| 6,225,985 | B1 | * | 5/2001 | Armstrong et al. | 345/177 |
| 6,229,529 | B1 | * | 5/2001 | Yano et al. | 345/175 |
| 6,310,610 | B1 | | 10/2001 | Beaton et al. | |
| 6,323,846 | B1 | | 11/2001 | Westerman et al. | |
| 6,327,011 | B2 | | 12/2001 | Kim | |
| 6,690,387 | B2 | | 2/2004 | Zimmerman et al. | |
| 6,856,259 | B1 | | 2/2005 | Sharp | |
| 7,015,894 | B2 | | 3/2006 | Morohoshi | |

(Continued)

FOREIGN PATENT DOCUMENTS

| JP | 2000-163031 A | 6/2000 |
|---|---|---|
| JP | 2002-342033 A | 11/2002 |
| WO | WO-2005/103872 | 11/2005 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Amare Mengistu
*Assistant Examiner* — Antonio Xavier
(74) *Attorney, Agent, or Firm* — Morrison & Foerster LLP

(57) ABSTRACT

Sensing of multiple touches on a surface of a material is provided. A beamed acoustic wave traveling in a substantially linear path along the surface of the material is formed by a plurality of transducers, e.g., a phased array, coupled to the surface. One or more echoes of the acoustic wave caused by a corresponding one or more touches on the path are detected with a detector. The detector may include, for example, one or more of the transducers in the plurality of transducers. The surface can be scanned with a plurality of beamed acoustic waves using a variety of configurations, such as parallel beams, radially emanating beams, etc.

18 Claims, 7 Drawing Sheets

(56) References Cited

U.S. PATENT DOCUMENTS

| | | |
|---|---|---|
| 7,079,118 B2 | 7/2006 | Benard et al. |
| 7,098,891 B1* | 8/2006 | Pryor .................... 345/158 |
| 7,184,064 B2 | 2/2007 | Zimmerman et al. |
| 7,489,308 B2* | 2/2009 | Blake et al. ............ 345/179 |
| 7,499,039 B2* | 3/2009 | Roberts .................. 345/177 |
| 7,573,466 B1* | 8/2009 | Marzen et al. ......... 345/177 |
| 7,663,607 B2 | 2/2010 | Hotelling et al. |
| 7,907,129 B2* | 3/2011 | Idzik et al. ............. 345/177 |
| 8,169,404 B1* | 5/2012 | Boillot .................... 345/158 |
| 8,479,122 B2 | 7/2013 | Hotelling et al. |
| 2004/0164970 A1* | 8/2004 | Benard et al. ........... 345/177 |
| 2005/0017959 A1* | 1/2005 | Kraus et al. ............ 345/173 |
| 2005/0052432 A1* | 3/2005 | Kraus et al. ............ 345/173 |
| 2005/0083313 A1* | 4/2005 | Hardie-Bick ........... 345/177 |
| 2005/0248548 A1* | 11/2005 | Tsumura et al. ........ 345/177 |
| 2006/0026521 A1 | 2/2006 | Hotelling et al. |
| 2006/0097991 A1 | 5/2006 | Hotelling et al. |
| 2006/0197753 A1 | 9/2006 | Hotelling |
| 2007/0211031 A1* | 9/2007 | Marc ....................... 345/163 |
| 2007/0240913 A1* | 10/2007 | Schermerhorn ........ 178/18.04 |
| 2008/0059761 A1* | 3/2008 | Norman ................... 712/11 |
| 2008/0114251 A1 | 5/2008 | Weymer et al. |
| 2008/0266266 A1* | 10/2008 | Kent et al. .............. 345/173 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

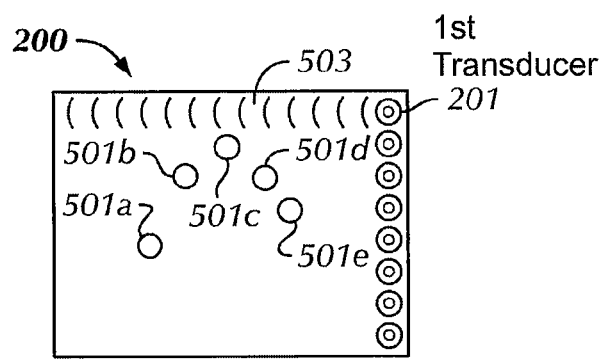
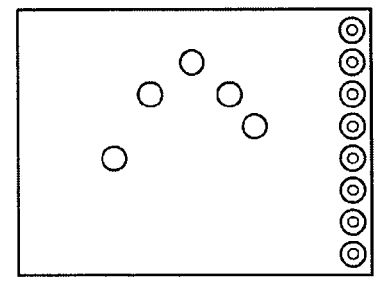
FIG. 5A   FIG. 5B
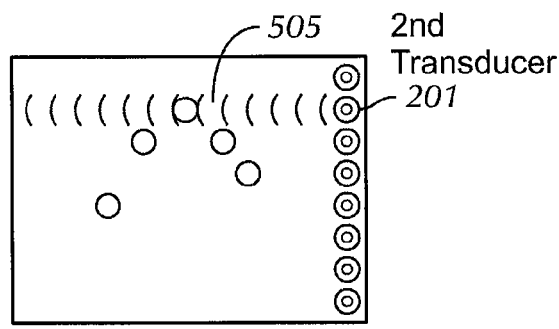
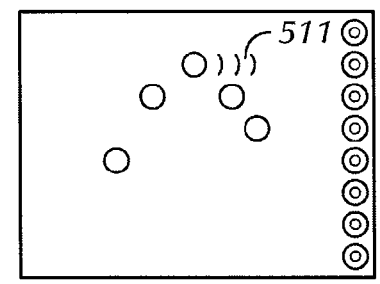
FIG. 5C   FIG. 5D
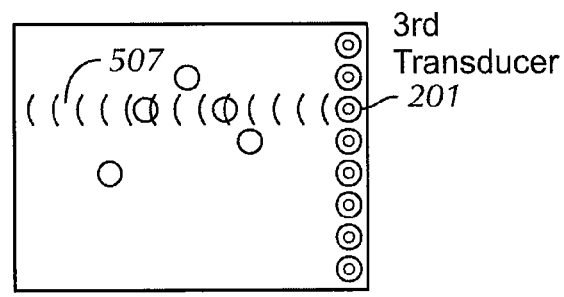
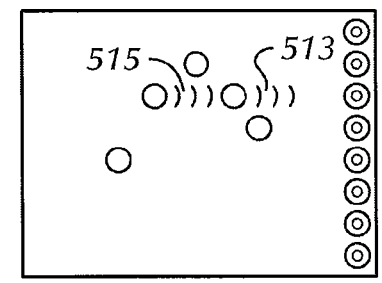
FIG. 5E   FIG. 5F

ACOUSTIC MULTI-TOUCH SENSOR PANEL

FIELD OF THE INVENTION

This relates generally to acoustic touch sensor panels, and in particular, to scanning a sensor panel with multiple beams of acoustic waves and processing echo signals generated by one or more touch events on the panel.

BACKGROUND OF THE INVENTION

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Acoustic touch sensor panels can be formed from a material that conducts ultrasonic waves, such as a plate of glass. Conventional acoustic touch sensor panels typically employ various schemes to detect touch, including a variety of schemes to transmit, for example, ultrasonic waves across a touch surface, e.g., utilizing various configurations of reflective gratings, transducer configurations, etc., and a variety of schemes to gather information from the resulting received waves. However, most conventional acoustic touch sensor panels cannot accurately sense more than one touch on the panel at a time.

SUMMARY OF THE INVENTION

The foregoing can be addressed by multiple touch sensing on a surface by forming a beamed acoustic wave that travels in a substantially linear path along the surface of a material, and detecting one or more echoes of the acoustic wave caused by a corresponding one or more touches on the path. A phased array of ultrasonic transducers can transmit the beamed acoustic wave, and a touch contact that lies along the path of the wave reflects part of the wave as an echo. The beamed wave, which is attenuated by the touch, continues traveling along the beam path, and each additional touch contact that lies along the beam path will partially reflect/attenuate the beamed wave. One or more reflected waves are detected by one or more receivers, which may be, for example, one or more of the transducers in the transducer array. The position of each touch contact can be determined by the timing of the corresponding reflected wave. The sensor panel is scanned with a plurality of beams of ultrasonic waves to determine all of the touch contacts on the panel. For example, a plurality of parallel beams could be used. In another example, the plurality of beams could "radiate" from a single area, e.g., lines that are colinear with the paths intersect approximately at the one or more transducers.

BRIEF DESCRIPTION OF THE DRAWINGS

FIGS. 5A-F illustrate the example scanning operation of FIG. 4.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to acoustic touch sensor panels, and in particular, scanning a sensor panel with acoustic waves, for example, ultrasonic waves, and processing echo signals generated by one or more touch events on the panel. An array of ultrasonic transducers can transmit a beamed ultrasonic wave that emanates in substantially a straight line path across the panel. A first touch contact that lies along the path of the transmitted ultrasonic wave beam reflects part of the wave as a first reflected wave, and the transmitted wave, which is attenuated by the touch, continues traveling along the beam path. Likewise, each additional touch contact that lies along the beam path of the transmitted wave will partially reflect/attenuate the transmitted wave. One or more reflected waves are detected by the transducer array, and the position of each touch contact can be determined by the timing of the corresponding reflected wave. The sensor panel is scanned with a plurality of beams of ultrasonic waves to determine all of the touch contacts on the panel.

Although embodiments of the invention may be described and illustrated herein in terms of ultrasonic transducers and waves, it should be understood that embodiments of this invention are not so limited, but are additionally applicable to other types of acoustic waves. Furthermore, although embodiments of the invention may be described and illustrated herein in terms of particular configurations of transducers on a glass panel, it should be understood that embodiments of the invention are also applicable to other configurations and other panel materials.

Figure 1A:
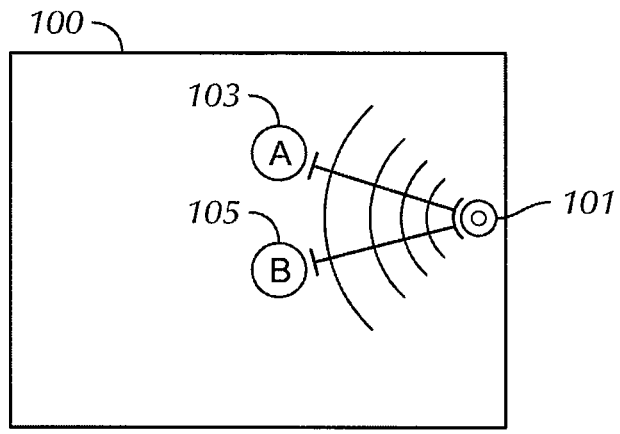
FIGS. 1A-C illustrate an example sensor panel.
Figure 1B:
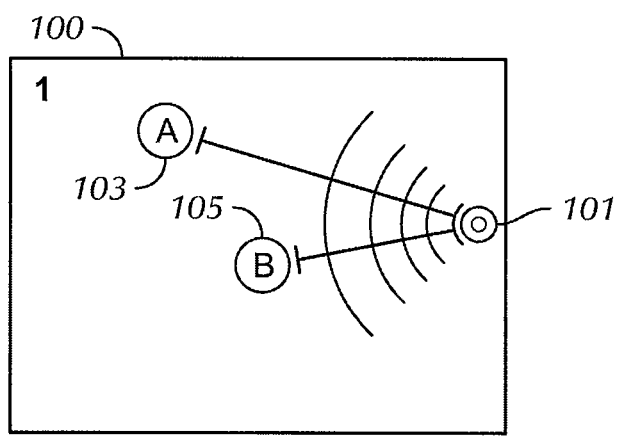
Figure 1C:
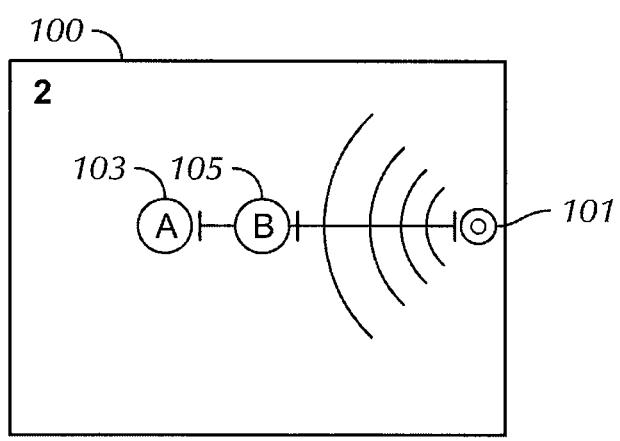

FIGS. 1A-C illustrate an example sensor panel 100, in which an ultrasonic transducer 101 emits omnidirectional waves (e.g., propagating radially from transducer 101) and determines touch contact by detecting echoes from the contact. In particular, FIGS. 1A-C illustrate how sensor panel 100 can have difficulties sensing multiple touch contacts 103 and 105. As shown in FIG. 1A, when touch contacts 103 and 105 are equidistant from transducer 101, the echoes returned by the multiple contacts reach transducer 101 at the same time. Thus, transducer 101 cannot distinguish between the two contacts 103 and 105. Instead, transducer 101 likely will interpret the echoes as emanating from a single touch contact.

In FIGS. 1B-C, contacts 103 and 105 are different distances from transducer 101. In this case, transducer 101 would detect two echoes occurring at different times, one for each of contacts 103 and 105, and would therefore be able to determine that there are two touch contacts on panel 100. However, transducer 101 would not be able to distinguish, for example, between the arrangements of contacts shown in FIG. 1B and FIG. 1C.

Figure 2:
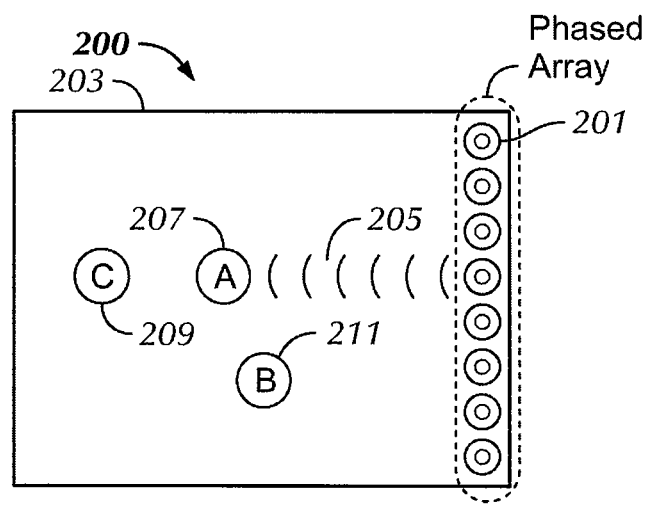
FIG. 2 illustrates an example acoustic multi-touch sensor panel according to embodiments of the invention.

FIG. 2 illustrates an example acoustic multi-touch sensor panel 200 according to embodiments of the invention. Sensor panel 200 includes a phased array of ultrasonic transducers 201 mounted on an edge of a glass pane 203. The phased array can form a beamed ultrasonic wave 205 by emitting specifically designed omnidirectional ultrasonic wave pulses from a plurality of transducers 201. More specifically, while the ultrasonic wave pulse emitted from each transducer 201 propagates radially from the transducer (i.e., a circular wave), the wave pulses are designed to add together to substantially cancel out radial portions of the emissions and form beam 205 that emanates in more or less a straight line across panel 203.

Figure 3:
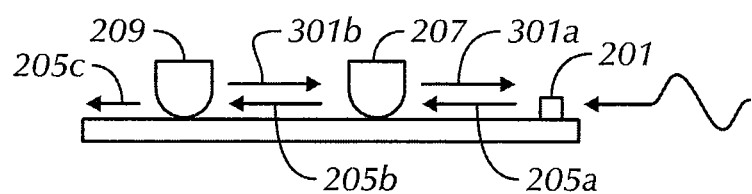
FIG. 3 illustrates a side view of FIG. 2 that shows more detail of multi-touch sensing of two contacts.

FIG. 2 also shows touch contacts 207, 209, and 211, which may be, for example, three fingertips touching panel 203. FIG. 3 illustrates a side view of FIG. 2 that shows more detail of multi-touch sensing of contacts 207 and 209. A first part of beam 205 (205a) is transmitted from phased array of transducers 201 and reaches contact 207. Contact 207 reflects a portion of beam 205a as an echo 301a, and an attenuated beam 205b continues past contact 207. When beam 205b reaches contact 209, a portion of the beam is reflected as an echo 301b, and an attenuated beam 205c continues past contact 209. Echoes 301a and 301b can be detected by one or more of transducers 201, and the timing of each echo can be used to determine the distance of the contact from the receiving one or more transducers.

Referring again to FIG. 2, because the ultrasonic waves emitted from the phased array of transducers 201 form a beam, contacts that lie outside of the beam, such as contact 211, are not detected. In addition, the positions of multiple contacts that lie within the beam can be accurately determined based on echo timing because the echoes all emanate from contacts that lie in a line on panel 200. Thus, the ambiguities described above with reference to FIGS. 1A-C may be avoided.

Figure 4:
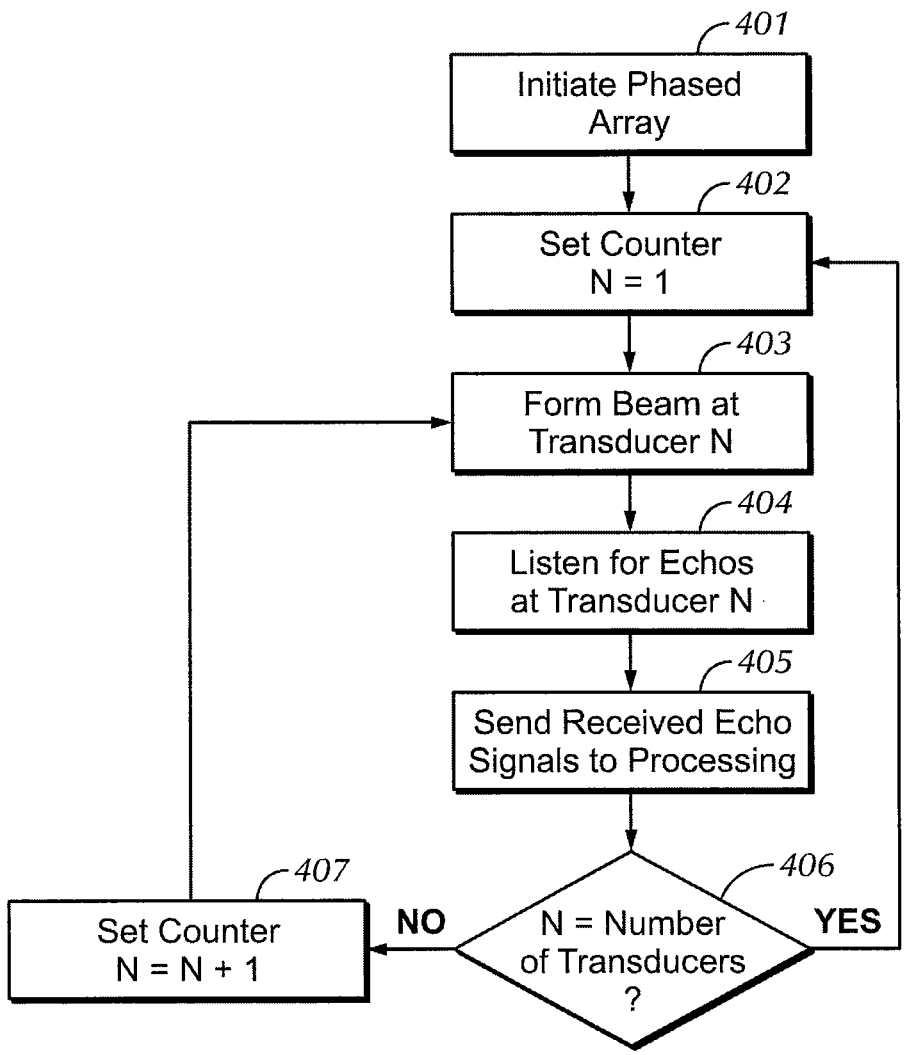
FIG. 4 is an example scanning operation according to embodiments of the invention.

An example scanning operation according to embodiments of the invention will now be described with reference to FIGS. 4 and 5A-C. FIG. 4 is a flowchart of the example scanning operation. The phased array of transducers 201 is initiated (401) and a counter N is set (402) equal to 1. The phased array enters a transmit phase in which an ultrasonic beam is formed (403) in a horizontal line across sensor panel 200 and intersecting with the 1st transducer 201 of the phased array, as illustrated in FIG. 5A. After a predetermined time, the phased array ceases transmitting the ultrasonic beam and enters a listening phase in which the 1st transducer 201 listens (404) for echo signals from touch contacts that lie within the beam. Echo signals received by the 1st transducer are sent to a processing module that processes (405) the signals to determine the positions of touch contacts along the path of the beam based on timing of the echo signals. The process then determines (406) whether the value of the counter N is equal to the total number of transducers 201 in the phased array. If N does not equal the number of transducers, the counter is incremented (407) and the process of forming a beam, receiving echo signals, and processing the echo signals repeats using the next transducer 201 in the phased array. At 406, if the value of counter N equals the number of transducers (i.e., the entire panel has been scanned), the counter is reset to 1, and the process repeats using the 1st transducer.

FIGS. 5A-F illustrate the example scanning operation of FIG. 4 during a time when there are five simultaneous touch contacts 501a-e on sensor panel 200. In FIG. 5A, the phased array of transducers 201 enters the first transmit phase, and transmits a first beam 503 along the top of panel 200 and along a line intersecting with the 1st transducer 201. In FIG. 5B, the phased array then enters the first listening phase to detect echoes. Because no touch contacts lie in within beam 503, no echoes are received by the 1st transducer. After a predetermined time, the phased array enters the second transmit phase, and transmits a second beam 505 along a line parallel to 503 and intersecting the 2nd transducer 201 (see FIG. 5C). A portion of beam 505 is reflected by contact 501c as an echo 511, which is detected by the 2nd transducer 201 of the phased array in the second listening phase (see FIG. 5D). The position of contact 501c can be determined based on the difference in the time beam 505 was transmitted and the time echo 511 was received.

FIG. 5E shows the third transmit phase, in which the phased array transmits a third beam 507 corresponding to the 3rd transducer 201 of the phased array. Beam 507 is partially reflected by contact 501d as an echo 513, and is partially reflected by contact 501b as echo 515. Echoes 513 and 515 are detected by the 3rd transducer 201 in the third listening phase (see FIG. 5F), and positions of contacts 501d and 501b can be determined as above. Additional transmit/listening phases are performed until the scan of panel 200 is completed.

Figure 6A:
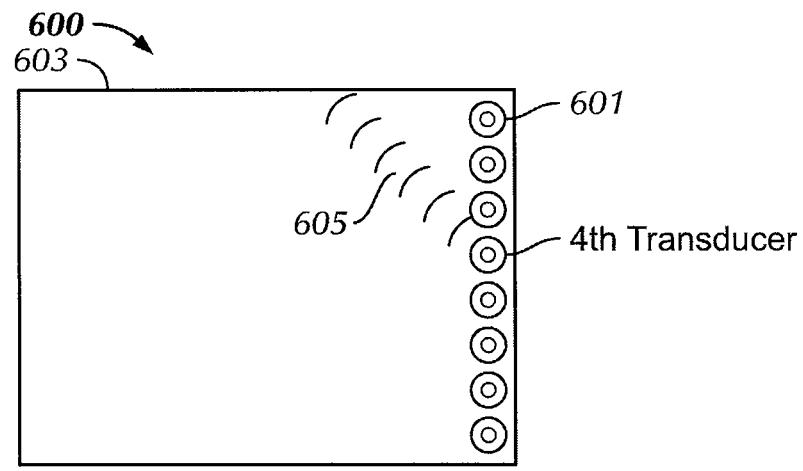
FIGS. 6A-C show another example scanning operation according to embodiments of the invention.
Figure 6B:
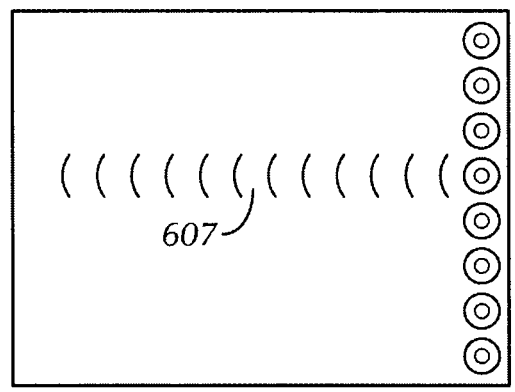
Figure 6C:
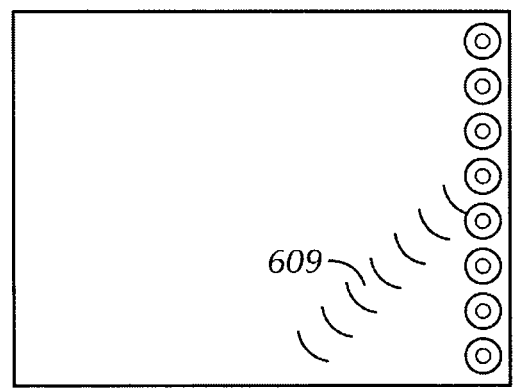

FIGS. 6A-C show another example scanning operation according to embodiments of the invention. In FIGS. 6A-C show a multi-touch acoustic sensor panel 600 including a phased array of transducers 601 mounted on a glass panel 603. Similar to the scanning operation of FIGS. 5A-F, the present scanning operation forms an ultrasonic beam during a transmit phase and listens for echo signals during a listening stage. However, rather than scanning with a plurality of parallel beams as in FIGS. 5A-F, the scanning operation of FIGS. 6A-C scans by "sweeping" the sensor panel with a plurality of radially emanating beams. FIG. 6A shows a first beam 605 emanating from the 4th transducer 601, which is approximately the center of the phased array, during the first transmit phase. Beam 605 is directed towards the upper (as shown in FIG. 6A) edge of panel 603. During the first listening phase (not shown), the 4th transducer receives echo signals from touch contacts on panel 603.

FIG. 6B shows a beam 607 formed during a later transmit phase. Beam 607 also emanates from the 4th transducer, but is directed towards the opposite edge of panel 603. During the corresponding listening phase, the 4th transducer listens for echo signals. FIG. 6C shows the last transmit phase, in which a beam 609 is directed towards the lower edge of panel 603. As in the previous listening phases, the 4th transducer listens for echoes in the last listening phase. While only three beams are shown in FIGS. 6A-C, it is understood that other beams are formed during other transmit phases, and the 4th transducer listens for echoes in other listening phases, to perform a complete scan of panel 603.

While the foregoing examples describe specific embodiments of the invention, one skilled in the art will readily understand, in light of the present disclosure, that the invention is not limited to these particular example embodiments. For example, one skilled in the art will understand that beams may be formed in other orders and configurations than described above. In addition, while the foregoing examples describe a single transducer listening and receiving echo signals, more than one transducer may be used. Also, the transducer or transducers listening for echoes need not be the transducer positioned along the line of the beam, but may be another transducer or transducers.

Figure 7:
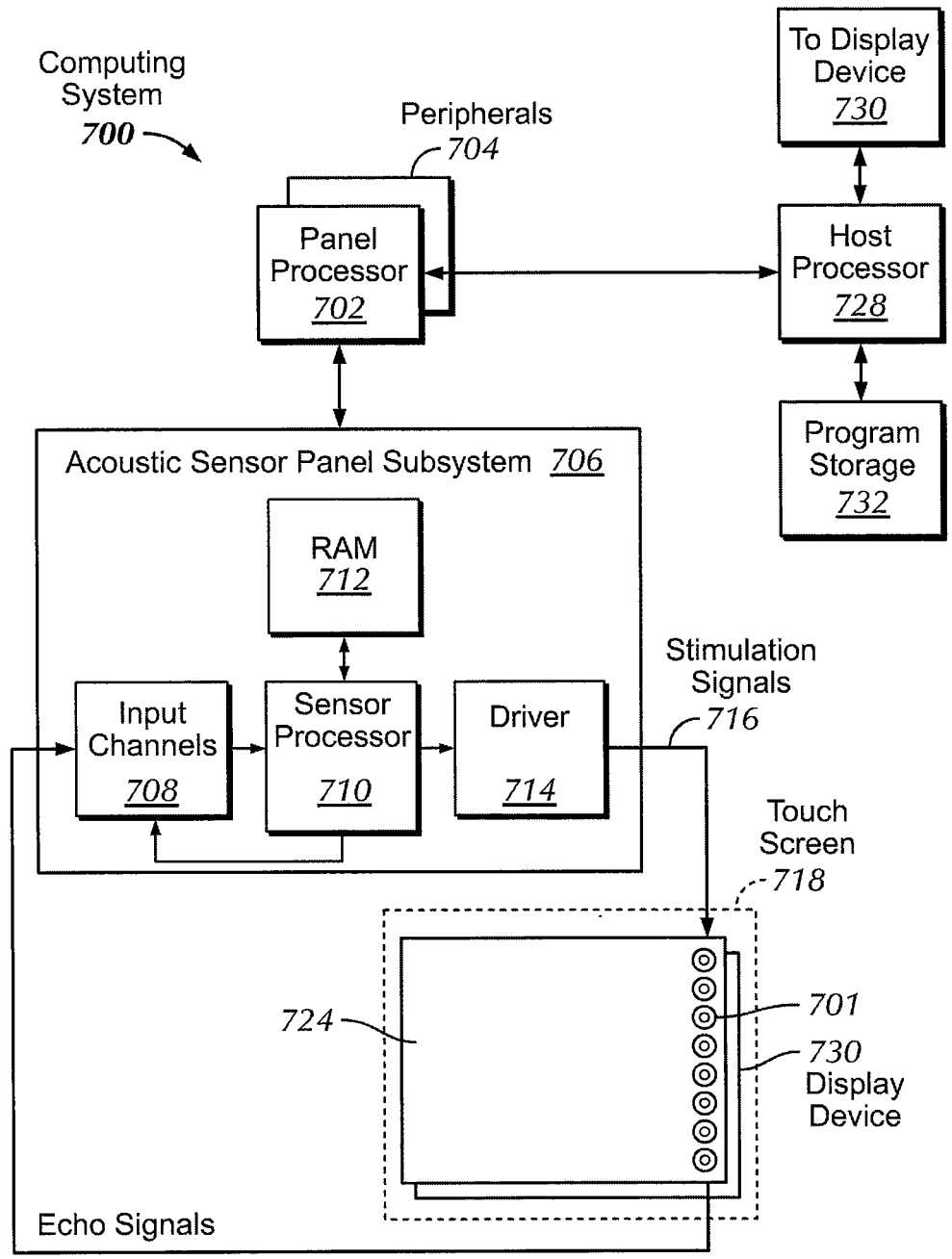
FIG. 7 illustrates example computing system that can include one or more of the embodiments of the invention.

FIG. 7 illustrates example computing system 700 that can include one or more of the embodiments of the invention described above. Computing system 700 can include one or more panel processors 702 and peripherals 704, and acoustic sensor panel subsystem 706. Peripherals 704 can include, but are not limited to, random access memory (RAM) or other types of memory or storage, watchdog timers and the like. Panel subsystem 706 can include, but is not limited to, one or more input channels 708, sensor processor 710 and driver 714. Sensor processor 710 can access RAM 712, autonomously read data from the input channels and provide control for the input channels. In addition, sensor processor 710 can driver 714 to generate stimulation signals 716 to drive a phased array of transducers 701 on sensor panel 724.

Touch sensor panel 724 can include phased array of transducers 701 that can detect multiple, simultaneous touch contacts and capture the touch contacts as an "image" of touch. (In other words, after panel subsystem 706 has determined whether a touch event has been detected in each scan of the touch sensor panel, the pattern of touch contacts in the multi-touch panel can be viewed as an "image" of touch (e.g. a pattern of fingers touching the panel).)

Computing system 700 can also include host processor 728 for receiving outputs from panel processor 702 and performing actions based on the outputs that can include, but are not limited to, transitioning between a high-resolution input mode and a low-resolution input mode according to one or more embodiments of the invention, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 728 can also perform additional functions that may not be related to panel processing, and can be coupled to program storage 732 and display device 730 such as an LCD display for providing a UI to a user of the device. Display device 730 together with touch sensor panel 724, when located partially or entirely under the touch sensor panel, can form touch screen 718.

Note that one or more of the functions described above can be performed by firmware stored in memory (e.g. one of the peripherals 704 in FIG. 7) and executed by panel processor 702, or stored in program storage 732 and executed by host processor 728. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 8A:
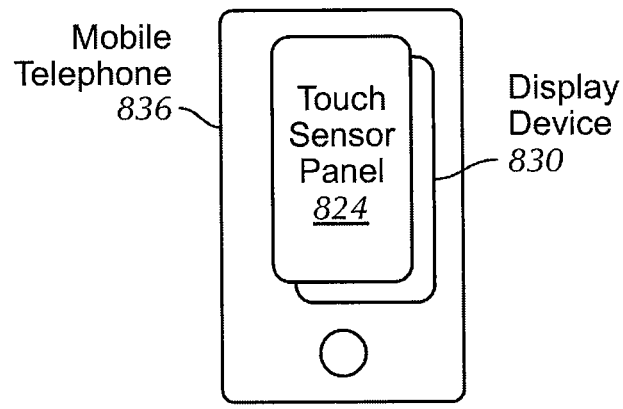
FIG. 8A illustrates an example mobile telephone having a touch sensor panel that is an acoustic multi-touch sensor panel according to embodiments of the invention.

FIG. 8A illustrates example mobile telephone 836 that can include touch sensor panel 824 and display device 830, the touch sensor panel being an acoustic multi-touch sensor panel according to embodiments of the invention.

Figure 8B:
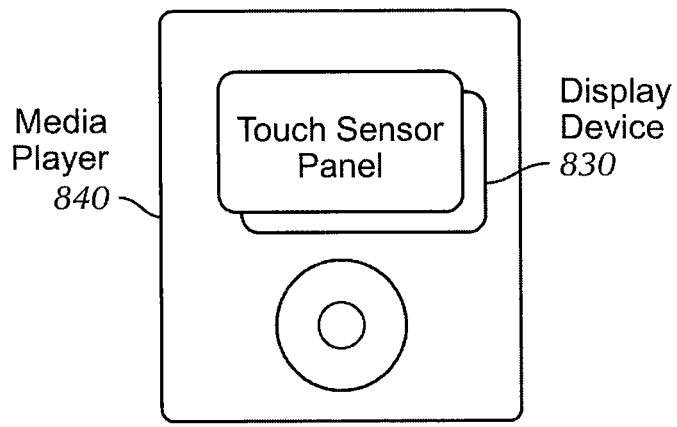
FIG. 8B illustrates an example digital media player having a touch sensor panel that is an acoustic multi-touch sensor panel according to embodiments of the invention.

FIG. 8B illustrates example digital media player 840 that can include touch sensor panel 824 and display device 830, the touch sensor panel being an acoustic multi-touch sensor panel according to embodiments of the invention.

Figure 8C:
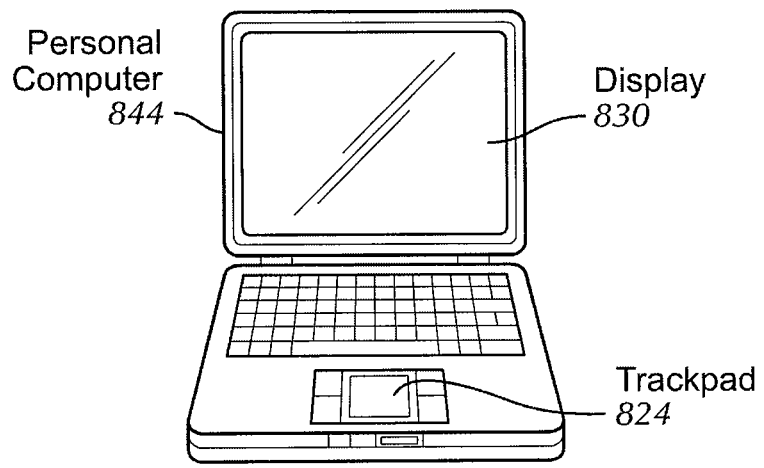
FIG. 8C illustrates an example personal computer having a touch sensor panel (trackpad) and/or display that is an acoustic multi-touch sensor panel according to embodiments of the invention.

FIG. 8C illustrates example personal computer 844 that can include touch sensor panel (trackpad) 824 and display 830, the touch sensor panel being an acoustic multi-touch sensor panel according to embodiments of the invention. The mobile telephone, media player and personal computer of FIGS. 8A, 8B, and 8C can allow multi-touch capability according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method of sensing multiple touches on a surface of a material, the method comprising:

forming, with a first plurality of transducers coupled to the surface, a first beamed acoustic wave that travels in a substantially linear first path along the surface of the material wherein the first plurality of transducers consists of a phased array along a first axis of the surface; and detecting, with a first detector, one or more echoes of the first acoustic wave caused by a corresponding one or more touches on the first path wherein the first detector and any other detector configured to detect echoes is located along the first axis of the surface; and resolving a position of a touch event on the surface of the material in a plurality of directions based only on the one or more echoes of the first acoustic wave formed by the first plurality of transducers.

2. The method of claim 1, wherein the first detector includes one of the transducers in the first plurality of transducers.

3. The method of claim 1, wherein the first detector includes a transducer that is not included in the first plurality of transducers.

4. The method of claim 1, wherein the first detector includes a plurality of transducers.

5. The method of claim 1 further comprising:
forming a second beamed acoustic wave that travels along the surface in a substantially linear second path that is different from the first path; and
detecting, with a second detector, one or more echoes of the second acoustic wave caused by a corresponding one or more touches on the second path.

6. The method of claim 5, wherein the first detector includes a first transducer and the second detector includes a second transducer that is different from the first transducer.

7. The method of claim 6, wherein the first path and the second path are substantially parallel to each other.

8. The method of claim 5, wherein the first detector consists of one or more transducers, and the second detector consists of the one or more transducers of the first detector.

9. The method of claim 8, wherein a line colinear with the first path and a line colinear with the second path intersect approximately at the one or more transducers of the first and second detectors.

10. An apparatus for sensing multiple touches on a surface, the apparatus comprising:
a material having a surface for receiving touches;
a single transmitter configured for forming a plurality of beamed acoustic waves traveling in substantially linear directions along the surface, wherein the transmitter consists of a plurality of transducers forming a phased array along a first axis of the surface plane; and
one or more receivers configured for detecting echoes caused by multiple touches impinging on one or more of the beamed acoustic waves, wherein the one or more receivers and any other receivers configured for detecting echoes are located along the first axis of the surface plane, and wherein the echoes can be used to resolve a position of a touch event on the surface of the material in a plurality of detection axes.

11. The apparatus of claim 10, wherein the one or more receivers include a transducer that is not included in the plurality of transducers of the transmitter.

12. The apparatus of claim 10, wherein the one or more receivers include a plurality of transducers.

13. The apparatus of claim 10, wherein the one or more receivers is a plurality of receivers, each receiver for detecting echoes corresponding to one of the beamed acoustic waves.

14. The apparatus of claim 13, wherein the directions of travel of the beamed acoustic waves are substantially parallel to each other.

15. The apparatus of claim 10, wherein lines colinear with the directions of travel of the beamed acoustic waves intersect approximately at the one or more receivers.

16. The apparatus of claim 10, the apparatus formed within a computing system.

17. A mobile telephone including an apparatus for sensing multiple touches on a surface, the apparatus comprising:
a material having a surface for receiving touches;
a single transmitter configured for forming a plurality of beamed acoustic waves traveling in substantially linear directions along the surface, wherein the transmitter consists of a plurality of transducers forming a phased array along a first axis of the surface plane; and
one or more receivers configured for detecting echoes caused by multiple touches impinging on one or more of the beamed acoustic waves, wherein the one or more receivers and any other receivers configured for detecting echoes are located along the first axis of the surface plane, and wherein the echoes can be used to resolve a position of a touch event on the surface of the material in a plurality of detection axes.

18. A digital media player including an apparatus for sensing multiple touches on a surface, the apparatus comprising:
a material having a surface for receiving touches;
a single transmitter configured for forming a plurality of beamed acoustic waves traveling in substantially linear directions along the surface, wherein the transmitter consists of a plurality of transducers forming a phased array along a first axis of the surface plane; and
one or more receivers configured for detecting echoes caused by multiple touches impinging on one or more of the beamed acoustic waves, wherein the one or more receivers and any other receivers configured for detecting echoes are located along the first axis of the surface plane, and wherein the echoes can be used to resolve a position of a touch event on the surface of the material in a plurality of detection axes.

\* \* \* \* \*